(12) United States Patent
Lee et al.

(10) Patent No.: US 9,198,229 B2
(45) Date of Patent: Nov. 24, 2015

(54) METHOD AND APPARATUS FOR TRANSRECEIVING DATA IN RADIO ACCESS SYSTEM SUPPORTING MULTIPLE RADIO ACCESS TECHNOLOGY

(75) Inventors: Eunjong Lee, Gyeonggi-do (KR); Heejeong Cho, Gyeonggi-do (KR); Youngsoo Yuk, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 146 days.

(21) Appl. No.: 14/002,995

(22) PCT Filed: Mar. 5, 2012

(86) PCT No.: PCT/KR2012/001602
§ 371 (c)(1),
(2), (4) Date: Sep. 4, 2013

(87) PCT Pub. No.: WO2012/121524
PCT Pub. Date: Sep. 13, 2012

(65) Prior Publication Data
US 2013/0337863 A1 Dec. 19, 2013

Related U.S. Application Data

(60) Provisional application No. 61/449,094, filed on Mar. 4, 2011.

(51) Int. Cl.
*H04B 7/00* (2006.01)
*H04W 88/06* (2009.01)
(Continued)

(52) U.S. Cl.
CPC ............. *H04W 88/06* (2013.01); *H04L 1/0026* (2013.01); *H04L 1/0027* (2013.01); *H04W 36/0083* (2013.01); *H04L 2001/0096* (2013.01); *H04W 36/14* (2013.01); *H04W 48/18* (2013.01)

(58) Field of Classification Search
USPC ............. 455/127.4, 426.1, 432.1, 434, 435.1, 455/435.2, 436, 525, 552.1, 553.1, 160.1; 370/331–334
See application file for complete search history.

(56) References Cited

U.S. PATENT DOCUMENTS

2007/0097931 A1* 5/2007 Parekh et al. .................. 370/338
2008/0014957 A1* 1/2008 Ore ............................ 455/452.1
(Continued)

FOREIGN PATENT DOCUMENTS

KR 10-2009-0046276 A 5/2009
KR 10-2010-0085146 A 7/2010

OTHER PUBLICATIONS

Inuk Jung, "Adhoc's updated Study Report on Hierarchical Networks," IEEE 802.16 Broadband Wireless Access Working Group, IEEE 802.16ppc-10/0002rl, Feb. 25, 2011.
(Continued)

*Primary Examiner* — Dominic E Rego
(74) *Attorney, Agent, or Firm* — Morgan, Lewis & Bockius LLP

(57) ABSTRACT

Provided is a method for a multiple radio access technology (RAT) terminal defining information related to a trigger metric and scanning for transmitting channel state information regarding a second system to a first system, and transmitting the channel state information regarding the second system to the first system. A method for the terminal transreceiving data with a first base station supporting a first base station and with a second base station supporting a second RAT in a radio access system supporting multiple RAT, according to one embodiment disclosed in the present invention, comprises: a step of receiving from the first base station triggering information related to the transmission of the channel state information regarding the second base station; and transmitting the channel state information on the second base station to the first base station.

6 Claims, 11 Drawing Sheets

(51) Int. Cl.
*H04L 1/00* (2006.01)
*H04W 36/00* (2009.01)
*H04W 36/14* (2009.01)
*H04W 48/18* (2009.01)

(56) References Cited

U.S. PATENT DOCUMENTS

| | | |
|---|---|---|
| 2009/0117909 A1 | 5/2009 | Kim et al. |
| 2009/0141683 A1 | 6/2009 | Grinshpun et al. |
| 2009/0191862 A1* | 7/2009 | Amirijoo et al. ............. 455/424 |
| 2009/0213812 A1* | 8/2009 | Park et al. .................... 370/331 |
| 2010/0124931 A1* | 5/2010 | Eskicioglu et al. ........... 455/440 |
| 2010/0260147 A1* | 10/2010 | Xing et al. .................... 370/332 |
| 2010/0290374 A1* | 11/2010 | Chin et al. .................... 370/281 |
| 2012/0039253 A1* | 2/2012 | Wang et al. ................... 370/328 |

OTHER PUBLICATIONS

Peretz Feder, et al., "Study Report on Hierarchical Networks: Revision to Subclause 5", IEEE 802.16 Broadband Wireless Access Working Group, IEEE 802.16ppc-10/0073, Jan. 5, 2011.

Written Opinion and International Search Report issued in corresponding International Patent Application No. PCT/KR2012/001602 dated Oct. 23, 2012.

Office Action dated Jul. 3, 2015, issued by the State Intellectual Property Office of China in Chinese Patent Application No. 201280020171.X.

* cited by examiner

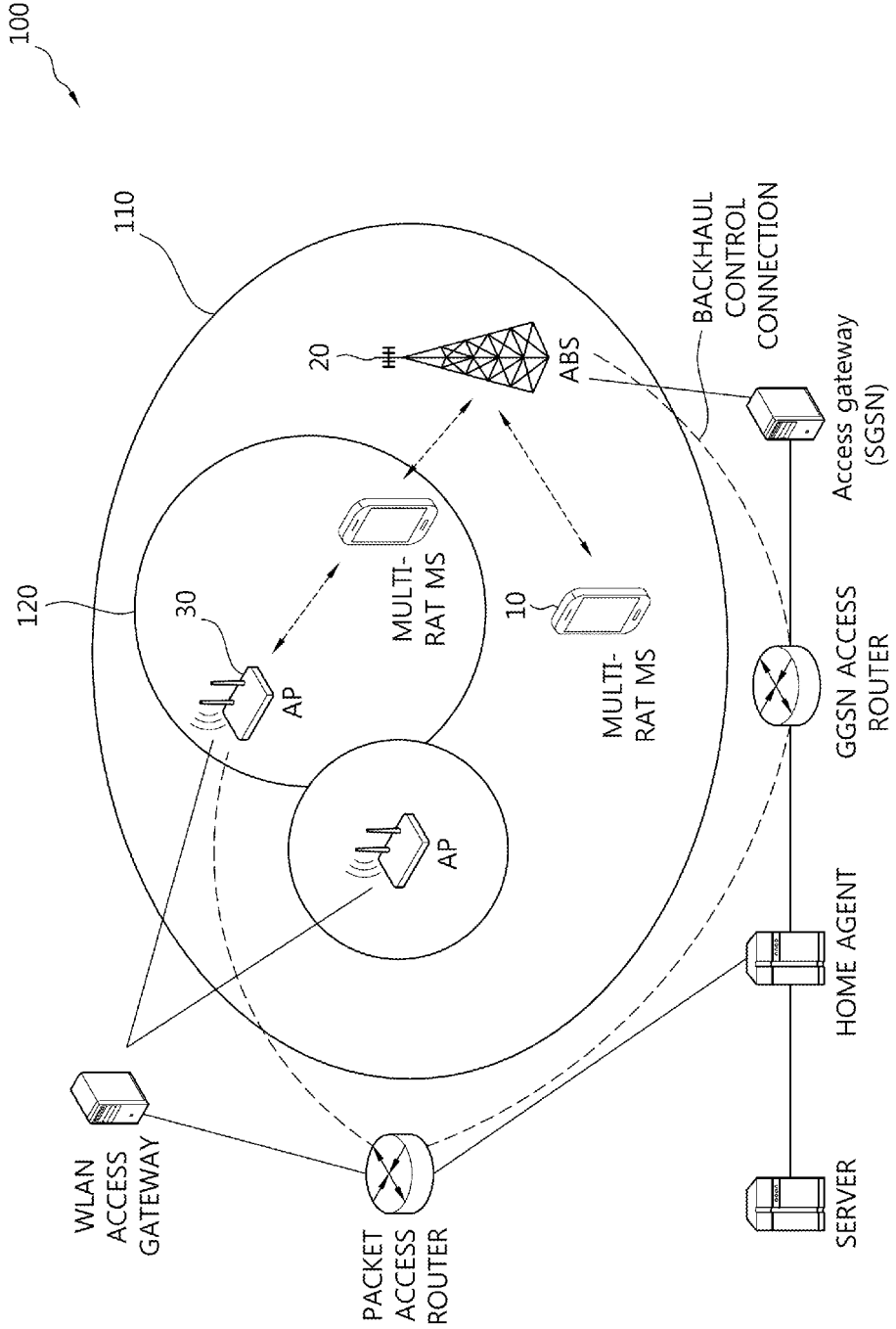

METHOD AND APPARATUS FOR TRANSRECEIVING DATA IN RADIO ACCESS SYSTEM SUPPORTING MULTIPLE RADIO ACCESS TECHNOLOGY

BACKGROUND OF THE INVENTION

1. Field of the Invention

The present invention relates to a radio access system supporting a multiple radio access technology (multi-RAT), and more particularly to a method and apparatus for transmitting and receiving data through two or more heterogeneous networks.

2. Related Art

Conventionally, in a wireless communication environment supporting two or more heterogeneous networks, even if a mobile station (MS) has multi radio access technology (RAT) capability, the MS cannot simultaneously access multi-RAT networks, and thus, the MS cannot simultaneously transmit and receive data to and from two or more heterogeneous networks.

That is, an MS supporting conventional multi-RAT accesses any one RAT network based on switching, and transmits and receives data through one network. Thus, when the MS having the multi-RAT capability transmits and receives data through a predetermined network and then transmits and receives data to and from another network different from the predetermined network, transmission and reception of data to and from any one network are stopped.

Thus, conventionally, an MS having capability for supporting two or more heterogeneous networks can perform communication through different networks. However, since the MS operates based on simple switching, the MS has limited efficiency.

In addition, different networks operate independently of each other, and thus, the MS operates inefficiently in terms of overall flow management thereof.

SUMMARY OF THE INVENTION

To solve the aforementioned problems, although an overall procedure for a multi-RAT capability negotiation process between a mobile station (MS) having multi radio access technology (RAT) capability and a base station indicating an overall control operation to simultaneously transmit and receive data via two or more networks has been currently defined, the details and methods of operations have not been defined yet.

Especially, it is obvious that, when a multi-RAT MS is simultaneously transmitting and receiving data to and from heterogeneous networks, i.e., a primary system and a secondary system, channel state information regarding the secondary system should be transmitted to the primary system, in order to provide seamless flow mobility to data that has been transmitted to and received from the secondary system, even if the multi-RAT MS is out of the coverage of the secondary system; however there is currently no specific solution to how the multi-RAT MS can transmit the channel state information regarding the secondary system to the primary system.

Accordingly, an object of the present invention lies in providing a method for defining a trigger metric for transmitting channel state information regarding a secondary system of a multi-RAT MS to a primary system and scanning-related information, and transmitting the channel state information regarding the secondary system to the primary system.

To achieve the above-mentioned technical task, there is provided a method for an MS to transmit and receive data to and from a first base station supporting a first RAT and a second base station supporting a second RAT in a radio access system supporting a radio access technology (RAT), according to one exemplary embodiment disclosed in the present invention, the method including: receiving from the first base station triggering information related to the transmission of the channel state information regarding the second base station; and transmitting the channel state information regarding the second base station to the first base station, based on the triggering information.

The triggering information may include: a trigger condition for triggering an action of transmitting the channel state information regarding the second base station to the first base station; and a trigger action field for instructing to transmit the channel state information regarding the second base station to the first base station according to the triggering condition.

In the receiving, the triggering information related to the transmission of the channel state information regarding the second base station may be received from the first base station, along with triggering information related to scanning of the second base station.

In the receiving, the triggering information related to the transmission of the channel state information regarding the second base station may be received from the first base station through an AAI_SCD, AAI_NBR-ADV, SFH, AAI_MC-ADV, or MultiRAT_NBR-ADV message.

In the receiving, the triggering information related to the transmission of the channel state information regarding the second base station may be received from the first base station in a broadcast way.

The method may further include, prior to the receiving, transmitting and receiving data for a first flow to and from the first base station and transmitting and receiving data for a second flow to and from the second base station.

The method may further include, after the transmitting, transmitting and receiving the data for the first and second flows to and from the first base station.

The channel state information may include channel quality information.

The triggering information may be defined specifically for the second base station.

To achieve the above-mentioned technical task, there is provided an MS that transmits and receives data to and from a first base station supporting a first RAT and a second base station supporting a second RAT in a radio access system supporting a radio access technology (RAT), according to one exemplary embodiment disclosed in the present invention, the MS including: a radio frequency unit for transmitting and receiving a radio signal to and from the outside; and a controller to be connected to the radio frequency unit, wherein the controller controls the radio frequency unit so as to receive from the first base station triggering information related to the transmission of the channel state information regarding the second base station, and controls the radio frequency unit so as to transmit the channel state information regarding the second base station to the first base station, based on the triggering information.

The triggering information may include: a trigger condition for triggering an action of transmitting the channel state information regarding the second base station to the first base station; and a trigger action field for instructing to transmit the channel state information regarding the second base station to the first base station according to the triggering condition.

The present invention has the advantage of providing seamless flow mobility by defining a trigger metric for transmitting channel state information regarding a secondary system of a multi-RAT MS and information related to the transmission of the channel state information.

BRIEF DESCRIPTION OF THE DRAWINGS

FIGS. 1a and 1b are diagrams showing concepts of multi-RAT networks to which an exemplary embodiment of the present invention can be applied.

DESCRIPTION OF EXEMPLARY EMBODIMENTS

Figure 1A:
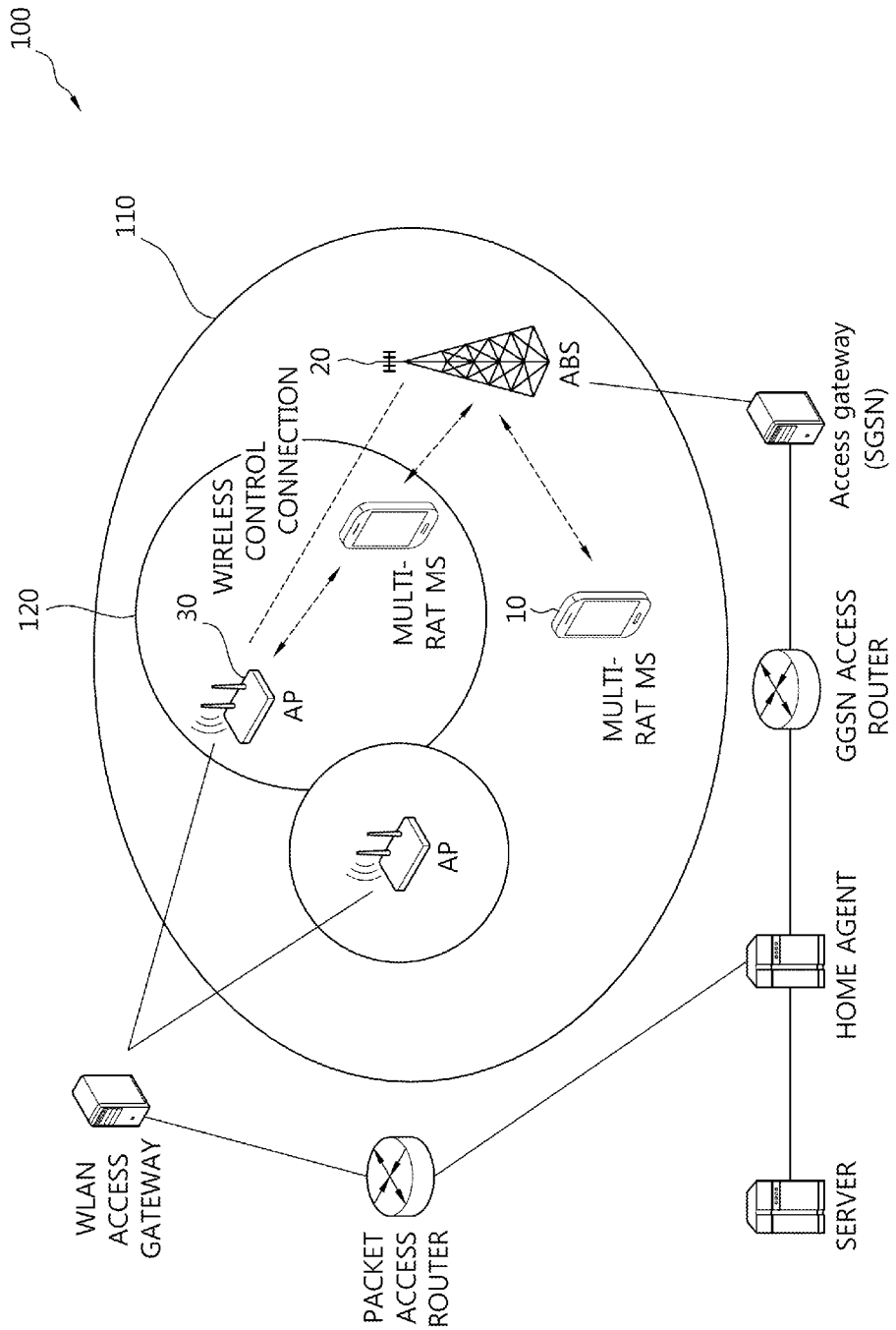

The following technologies may be used in various wireless communication systems such as code division multiple access (CDMA), frequency division multiple access (FDMA), time division multiple access (TDMA), orthogonal frequency division multiple access (OFDMA), and single carrier frequency division multiple access (SC-FDMA).

CDMA may be implemented as a radio technology such as universal terrestrial radio access (UTRA) or CDMA2000. TDMA may be implemented as a radio technology such as global system for mobile communications (GSM), general packet radio service (GPRS), and enhanced data rates for GSM evolution (EDGE). OFDMA may be implemented as radio technology such as institute of electrical and electronics engineers (IEEE) 802.11 (Wi-Fi), IEEE 802.16 (WiMAX), IEEE 802.20, and evolved-UTRA (E-UTRA). IEEE 802.16m is an evolved version of IEEE 802.16e and provides backward compatibility with a system based on IEEE 802.16e.

UTRA is a part of universal mobile telecommunication system (UMTS).

3rd generation partnership project (3GPP) long term evolution (LTE) is a part of evolved UMTS (E-UMTS) using evolved-UMTS terrestrial radio access (E-UTRA) and employs OFDMA on downlink and SC-FDMA on uplink. LTE-advanced (LTE-A) is an evolved version of 3GPP LTE.

Hereinafter, the present invention will be described in detail by explaining exemplary embodiments of the invention with reference to the accompanying drawings. The same reference numerals in the drawings denote like elements, and a repeated explanation thereof will not be given. In the description of the present invention, certain detailed explanations of the related art are omitted when it is deemed that they may unnecessarily obscure the essence of the invention. The features of the present invention will be more clearly understood from the accompanying drawings and should not be limited by the accompanying drawings. It is to be appreciated that all changes, equivalents, and substitutes that do not depart from the spirit and technical scope of the present invention are encompassed in addition to the accompanying drawings in the present invention.

Hereinafter, a method in which a mobile station (MS) accesses two or more heterogeneous networks (or multi radio access technology (RAT) networks) and simultaneously transmits and receives data through the networks in a multi-RAT network proposed in the present invention will be described.

The multi-RAT network proposed in the present invention will be described below.

FIGS. 1a and 1b are diagrams showing concepts of multi-RAT networks to which an exemplary embodiment of the present invention can be applied.

The multi-RAT network refers to a wireless communication environment in which two or more heterogeneous networks coexist and an MS accesses the heterogeneous networks to simultaneously perform communication.

Here, an MS for simultaneously communicating with two or more heterogeneous networks may also be referred to as a 'multi-RAT MS' or a 'multi system MS'.

With regard to a predetermined network, a heterogeneous network (or a heterogeneous system) refers to a network using a different communication method from a communication method used in the predetermined network.

For example, a wireless fidelity (WiFi) network and a worldwide interoperability for microwave access (WiMAX) network as an example of a mobile communication system correspond to heterogeneous networks.

RAT is a technology type used in radio access. Examples of RAT may include GSM/EDGE radio access network (GERAN), UMTS terrestrial radio access network (UTRAN), evolved-UMTS terrestrial radio access network (E-UTRAN), WiMAX, LTE(-A), and WiFi. That is, GERAN, UTRAN, E-UTRAN, WiMAX, and/or WiFi coexist in the same area.

As shown in FIG. 1, a multi-RAT network 100 may include a primary system 110 and a secondary system 120.

Here, the primary system 110 and the secondary system 120 may be referred to as a primary network and a secondary network, respectively. The primary system 110 may include a multi-RAT MS 10, a base station 20, and the secondary system 120. The secondary system 120 may include the multi-RAT MS 10 and an access point (AP) 30.

The primary system may have coverage of a wide range and may be a mobile communication system. For example, the primary system may be a WiMAX or LTE(-A) system. In addition, the primary system is always in a predetermined status with respect to the multi-RAT MS. That is, the primary system maintains an active status, a sleep mode status, or an idle mode status with respect to the multi-RAT MS.

The secondary system may have coverage of a small range and may be a wireless local area network (WLAN) system. For example, the secondary system may be a Wi-Fi system. That is, the secondary system may be added to or deleted from the multi-RAT network depending on the cases. In addition, the secondary system may be used for data communication which mainly requires a higher bandwidth (BW). Thus, mapping may be performed on a specific flow (quality of service (QoS)) in order to use the secondary system.

Herein, the AP as an example of the secondary system may operate in the same way as an MS capable of communicating with the primary system.

In addition, the primary system and the secondary system are connected to each other in a wired or wireless manner in the multi-RAT network. That is, a base station of the primary system and a base station of the secondary system may be connected to each other through a backbone network in a wired manner (FIG. 1b) or may be connected to each other in a wireless manner (FIG. 1a).

Hereinafter, for convenience of description, it is assumed that the primary system is a WiMAX system and the secondary system is a Wi-Fi system unless otherwise described. Accordingly, a base station corresponding to the primary system will be referred to as a 'base station' and a base station corresponding to the secondary system will be referred to as an 'AP'. In addition, access to the primary system may have the same meaning as access to the base station of the primary system and access to the secondary system may have the same meaning as access to the AP.

Figure 2:
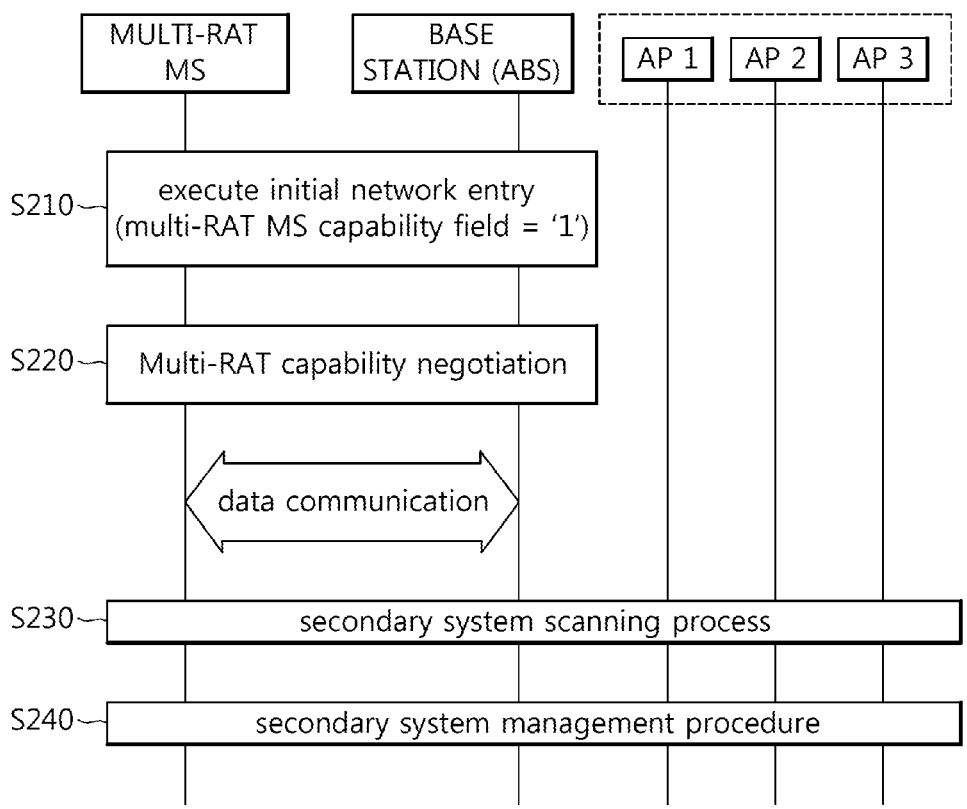
FIG. 2 is a flowchart of a method for a multi-RAT MS to transmit and receive data through a primary system and a secondary system according to an exemplary embodiment of the present invention.

FIG. 2 is a flowchart of a method for a multi-RAT MS to transmit and receive data through a primary system and a secondary system according to an exemplary embodiment of the present invention.

Referring to FIG. 2, the multi-RAT MS executes an initial network entry process to an ABS (S210).

The multi-RAT MS transmits an indicator indicating that the multi-RAT MS supports multi-RAT to the ABS via the initial network entry process to the ABS. Here, the indicator may be a multi-RAT mobile station (MS) capability field. In addition, the indicator, that is, the multi RAT MS capability field may have a size of 1 bit.

The indicator may be transmitted via a registration process performed during the initial network entry process to the ABS. In this case, the indicator may be transmitted to the ABS through a registration request/registration response (REG-REQ/REG-RSP) message.

For example, when the indicator is set to '1', the indicator indicates that a MS supports multi-RAT. When the indicator is set to 0', the indicator indicates that a MS does not support multi-RAT.

In addition, when the ABS receives the registration request REG-REQ message or registration response REG-RSP message including the indicator (e.g., an indicator set to '1') indicating that the multi-RAT MS has capability for supporting multi-RAT from the multi-RAT MS, the ABS may transmit, to the multi-RAT MS, notification information indicating that a separate multi-RAT capability negotiation process for supporting the multi-RAT MS is performed after the initial network entry process is completed or a predetermined time elapses.

For example, when the notification information is set to '1', the notification information indicates that the ABS and the multi-RAT MS perform the separate multi-RAT capability negotiation process in order to support multi-RAT. When the notification information is set to '0', the notification information indicates that the separate multi-RAT capability negotiation process does not have to be performed Then, when the multi-RAT MS and the ABS complete the initial network entry process, the multi-RAT MS and the ABS perform the multi-RAT capability negotiation process (S220). In general, the multi-RAT capability negotiation process is performed after a network (re-)entry process is completed. However, the multi-RAT capability negotiation process may also be performed during the network (re-)entry process to the ABS.

For example, when the multi-RAT capability negotiation process is performed during the network (re-)entry process, the multi-RAT MS and the ABS may perform the multi-RAT capability negotiation process via a registration procedure of the ABS and the multi-RAT MS. In this case, the multi-RAT MS and the ABS may transmit and receive information about multi-RAT capability negotiation through the registration request/registration response (REG-REQ/REG-RSP) message.

The multi-RAT capability negotiation process of the multi-RAT MS and the primary system will be described in more detail below.

Then, the multi-RAT MS performs an AP scanning process for access to the secondary system based on secondary system-rated information received from the ABS (S230).

Here, the multi-RAT MS performs a scanning process on APs in the vicinity of the MS periodically or in an event-triggered manner in order to access the secondary system.

First, it is assumed that data communication of all data transmitted to the multi-RAT MS is performed using a dynamic service (DSx) procedure with the ABS of the primary system and communication between the secondary system and the multi-RAT MS is performed by transmitting data of a specific flow to the secondary system based on determination of the ABS of the primary system.

The AP scanning process of the multi-RAT MS for the access to the secondary system may be performed through a process of scanning the APs in the vicinity of the ABS and reporting the result of scanning the APs in the vicinity of the ABS to the ABS with reference to FIGS. 3 to 6 to be described later. The scanning process of the multi-RAT MS will be described in detail with reference to FIGS. 3 to 6 to be described later.

Next, the multi-RAT MS performs a management (or operation) procedure with the secondary system (S240). Here, the management procedure with the secondary system refers to processes, such as association, disassociation, and re-association with the secondary system of the multi-RAT MS. Here, the management procedure of the secondary system is controlled by the primary system.

After performing the association procedure with the secondary system, the multi-RAT MS transmit and receive data through the AP of the secondary system.

Here, in order to access the secondary system, the multi-RAT MS has to receive an acknowledgement response for the access to the secondary system from the primary system.

That is, as described above, the ABS selects an AP that the multi-RAT MS accesses and checks the state of the selected AP before the multi-RAT MS sends the acknowledgement for the access to the secondary system to the multi-RAT MS. If, as a result of the check, the access to the selected AP is possible, the ABS can send information about the multi-RAT MS to the selected AP in advance.

Furthermore, when the ABS sends the acknowledgment response to the multi-RAT MS, the ABS can also send information that is necessary or useful for the multi-RAT MS to access the AP.

For example, the necessary or useful information can be an SSID, the MAC address of the AP, WEP key, or channel number (or frequency information), the protocol version (11a/b/n . . . ) of the AP, and offset information between a beacon and the frames of the base station (a relative location of the beacon is indicated by a difference with a specific frame time and transmitted).

Furthermore, if the multi-RAT MS recognizes that the multi-RAT MS has entered the coverage of the secondary system as a result of the executed scanning on the AP for the access to the secondary system, the multi-RAT MS may request access to the secondary system to the base station of the primary system.

Messages necessary for the management procedure of the secondary system can include the following messages.

1. A secondary system request (SS_REQ) message
: is used for the multi-RAT MS to request access to the AP.

2. A secondary system command (SS_CMD) message
: is a message used to manage access to the AP and is used for association, disassociation, or re-association with or from the AP.

3. A secondary system indication (SS_IND) message
: is a message used as a response to the secondary system command message and is used for the multi-RAT MS to inform the base station of an association success, a disassociation success, or a re-association success with the AP.

Next, if the access to the AP of the secondary system is successful, the multi-RAT MS is able to transmit and receive data to and from the primary system and transmit and receive data to and from the secondary system at the same time. Here, the data transmitted and received to and from the multi-RAT MS through the AP is controlled by the primary system.

A multi-RAT capability negotiation process between the multi-RAT MS and the ABS is described in detail below.

As described above, the multi-RAT capability negotiation process between the multi-RAT MS and the ABS is performed after network (re-)entry.

Here, in the case of the network re-entry, the multi-RAT capability negotiation process can be omitted. This is because to perform the same procedure already performed when the multi-RAT MS re-enters the same system over a network generates an unnecessary overhead because capability negotiations for multi-RAT have already been performed through the initial network entry procedure between the multi-RAT MS and the ABS.

Furthermore, in the case of a handover (HO), a target base station of the primary system can perform multi-RAT capability negotiations with the multi-RAT MS in advance over a backbone network from the serving base station of the primary system.

A process of the multi-RAT MS performing the multi-RAT capability negotiation process with the primary system can be as follows.

First, the ABS can send information related to the secondary system to the multi-RAT MS. That is, if the ABS has common information about the APs of the secondary system that have to be received by the multi-RAT MS, the ABS can send the AP information to the multi-RAT MS in a broadcast or unicast way.

Here, the information related to the secondary system refers to information about a heterogeneous system that belongs to the same coverage as the primary system. Here, the multi-RAT MS may not need to know all secondary systems included in the primary system and information related to the secondary systems. In this case, the ABS does not send all pieces of information about the secondary systems and related to the secondary systems, but can send a list of pieces of information related to (necessary for) the multi-RAT MS to the multi-RAT MS in a unicast way. In this case, the list can be transmitted in the multi-RAT capability negotiation process.

Next, the multi-RAT MS sends a multi-system capability request message to the ABS. The multi-system capability request message can include, for example, the 802.11 MAC address of the MS, existing access AP information, and protocol version information of 802.11. The 802.11MAC address is necessary for authentication information. If the existing access AP information is included in the multi-system capability request message, the multi-system capability request message is transmitted to only a base station to which the existing access AP belongs.

Next, the ABS sends a multi-system capability response message to the multi-RAT MS in response to the multi-system capability request message.

The multisystem capability response message can include information about candidate APs.

Furthermore, if the multi-RAT MS enters idle mode, the ABS can store information, obtained through the multi-RAT capability negotiation process with the multi-RAT MS, for a certain time. That is, the ABS can newly define a multi-RAT information maintenance timer, can store the obtained information until the multi-RAT information maintenance timer expires, and can discard the obtained information after the timer expires.

Accordingly, if the multi-RAT MS performs network re-entry into the ABS before the multi-RAT information maintenance timer expires, the multi-RAT capability negotiation process can be omitted.

An operation (or management) method of the secondary system is described in detail below. Here, the operation of the secondary system refers to association or disassociation between the secondary system and the multi-RAT MS and re-association between the multi-RAT MS and the secondary system, and the operation of the secondary system is controlled by the ABS, that is, the primary system.

As an example of the operation method of the secondary system, a process of the multi-RAT MS accessing (or associating with) the secondary system, that is, a process of the multi-RAT MS adding the secondary system and transmitting and receiving data to and from the primary system and the secondary system at the same time, is described.

In order to access the secondary system, the multi-RAT MS or the ABS can perform a multi-RAT association request. In this case, the multi-RAT MS or the ABS can perform a multi-RAT association request process through a secondary system association request/response message.

If a secondary system is added at the request of the multi-RAT MS, when the multi-RAT MS detects the secondary system satisfying a specific condition by performing scanning, the multi-RAT MS can request the ABS for association with the secondary system by sending a secondary system request message to the ABS.

Furthermore, if a secondary system is added at the request of the base station, when the ABS detects that specific flow association is generated in the multi-RAT MS, the ABS checks the state of an AP that can be accessed to the multi-RAT MS.

If, as a result of the check, access to the multi-RAT MS is possible, the ABS can instruct association between the multi-RAT MS and the secondary system by sending a secondary system access command message to the multi-RAT MS.

Here, control of the multi-RAT MS for accessing multi-RAT, that is, the transmission of control information, is performed by the base station of the primary system. In this case, QoS for corresponding data has only to comply with a method supported by a primary system because the multi-RAT MS simply performs data transmission and reception with the secondary system. In this case, the transmission of the control information can be performed through the secondary system access command message.

Here, the secondary system access command message can include information about a selected AP, information about a flow transmitted to the secondary system, and an authentication method (an open system or a shared key).

Next, the multi-RAT MS completes access to a specific AP and a traffic stream (TS) configuration with reference to AP information within the secondary system command message in response to an access command of the secondary system of the ABS. For example, an ADDTS request/response process of 802.11e can be performed.

Next, the multi-RAT MS informs the ABS of a result of an association success for the specific AP.

In this case, the association success can be performed through a secondary system indication (SS_IND) message. The secondary system indication message can include a result of the mapping of a flow ID (FID) and an association ID (AID)/traffic stream ID (TSID) for a corresponding flow.

Next, the multi-RAT MS transmits and receives data for a specific flow through the secondary system. That is, the multi-RAT MS transmits and receives data to and from the primary system and the secondary system at the same time according to a data flow.

That is, in the case of DL data, the ABS sends the DL data to the multi-RAT MS through the AP.

Furthermore, in the case of UL data, data for a specific flow ID indicated by the ABS is transmitted through the secondary system, for example, over a WLAN.

Furthermore, the multi-RAT MS can perform re-association or disassociation with the AP by transmitting and receiving the secondary system command/indication messages to and from the ABS.

Furthermore, if the multi-RAT MS gets out of the secondary system, for example, a WLAN coverage while transmitting and receiving data to and from the AP and there is no neighbor AP nearby, the base station can control seamless flow mobility between the AP and the base station so that the data transmitted to and received from the AP is seamlessly transmitted through the base station of the primary system.

Furthermore, if the multi-RAT MS detects a neighbor AP while transmitting and receiving data to and from the AP of the secondary system, the ABS can perform control so that the data now being transmitted to and received from the multi-RAT MS is seamlessly transmitted and received between the AP and the neighbor AP.

A method of releasing (or dissociating) the secondary system is described below.

If the multi-RAT MS determines that a channel state with the secondary system now being accessed thereto is not good, the multi-RAT MS performs scanning on neighbor secondary systems.

If the multi-RAT MS determines that there is no detected secondary system as a result of the scanning into the neighbor secondary systems, the multi-RAT MS dissociates the secondary system now being accessed thereto.

In this case, if data corresponding to a specific flow of the primary system is being transmitted and received through the secondary system and the MS is unable to perform an HO to a neighbor AP secondary system, the ABS has to support multi-RAT seamless flow mobility so that seamless flow mobility can be performed without a data loss for the corresponding flow.

Alternatively, in this case, when the multi-RAT MS completes the transmission of data transmitted to and received from the secondary system, the ABS can release association with the secondary system.

The re-association (e.g., a handover to a neighbor AP) of the secondary system is described below.

Here, it may be assumed that the re-association of the secondary system, that is, a handover between secondary systems, is performed on only specific association.

Here, the re-association of the secondary system, that is, a handover between the secondary systems, is seamlessly performed through the primary system.

If the multi-RAT MS determines that the channel state of the secondary system now being accessed thereto is not good, the multi-RAT MS or the ABSation can release association with the secondary system now being accessed thereto and request a handover (HO) to another secondary system.

That is, the ABS informs the multi-RAT MS that there is no longer data transmitted and received through a current serving secondary system by sending an SS-CMD message to the multi-RAT MS. Next, the ABS instructs the multi-RAT MS to transmit and receive existing transmitted data through the primary system. If the transmission of the existing data is completed, the base station instructs the multi-RAT MS to transmit and receive data to and from a new secondary system. That is, a seamless handover between the secondary systems can be performed through the primary system.

Furthermore, when the multi-RAT MS performs a handover between primary systems, if the coverage of the secondary system is located at the boundary of the primary systems, the multi-RAT MS can perform a handover between the primary systems seamlessly by using the secondary system.

Furthermore, if the multi-RAT MS moves within the primary system, for example, WiMAX coverage at high moving speed, the ABS can instruct the multi-RAT MS not to perform association with the secondary system although the multi-RAT MS has entered the coverage of the secondary system. That is, this management of the secondary system can be performed based on the speed of the multi-RAT MS.

Exemplary embodiments of a procedure for a multi-RAT MS to scan secondary systems (second base stations) suggested in the present invention will be described below.

First Exemplary Embodiment

The first exemplary embodiment provides a method for a multi-RAT MS to scan second base stations (or secondary systems) by receiving a multi-RAT scan command message from the first base station (or primary system).

Hereinafter, for convenience of description, it is assumed that the primary base station is referred to as an 'ABS' and the second base station is referred to as an 'AP'.

That is, the first exemplary embodiment involves defining information included in a multi-RAT scan command message instructing a multi-RAT MS to scan APs, and defining information to be transmitted to the ABS after the scanning of the APs.

Figure 3:
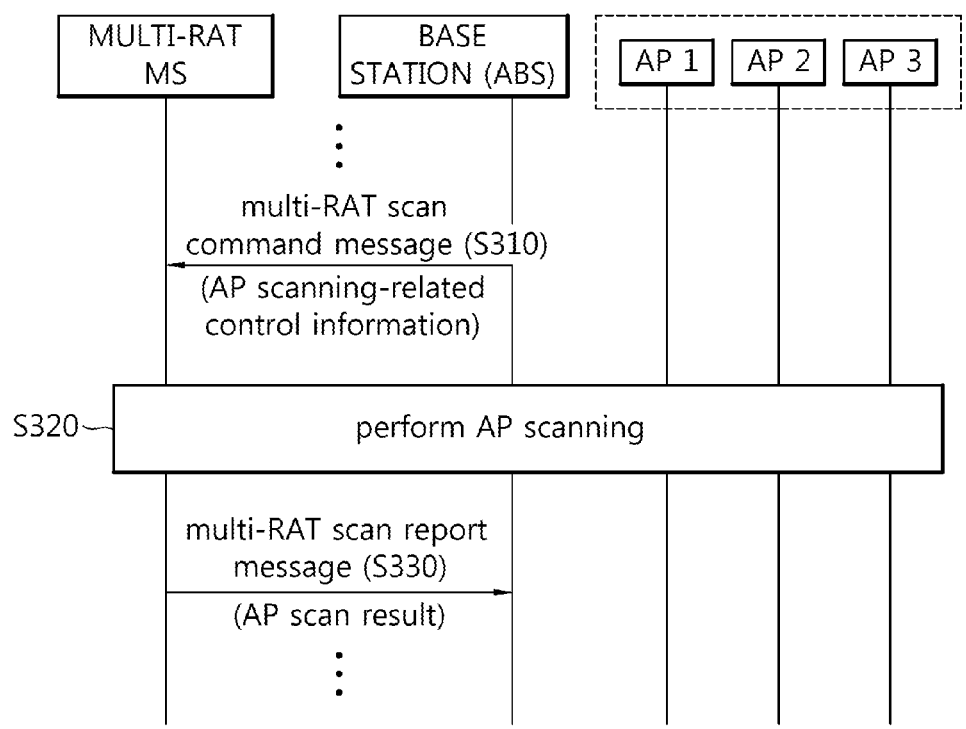
FIG. 3 is a flowchart showing a scanning procedure of a multi-RAT MS according to a first exemplary embodiment of the present invention.

FIG. 3 is a flowchart showing a scanning procedure of a multi-RAT MS according to a first exemplary embodiment of the present invention.

The steps S210, S220, and S240 of FIG. 2 also apply to the first exemplary embodiment to be described below. Accordingly, only the scanning procedure of the multi-RAT MS will be described in detail below.

Referring to FIG. 3, if the ABS determines that the multi-RAT MS needs to communicate with APs (for example, position/speed of the multi-RAT MS), the ABS sends the multi-RAT MS a multi-RAT scan command (AAI_MultiRAT-SCN-CMD) message containing AP scanning-related control information in order to instruct the multi-RAT MS to scan the APs (S310).

Here, the multi-RAT scan command message may be referred to as a scan request message.

The AP scanning-related control information is for helping the multi-RAT MS detect the APs, and may include the parameters described below. In addition to the parameters described below, the AP scanning-related control information may further include information contained in a message (for example, AAI_SCN-RSP message) through which a base station instructs an MS to perform scanning in an IEEE 802.16 system or LTE(-A) system. In this case, a beacon interval defined in an 802.11 system, instead of a scan interval, may be transmitted through the multi-RAT scan command message.

That is, the AP scanning-related control information may include at least one of BSS (Basic Service Set) Type, BSSID (Basic Service Set Identifier), SSID (Service Set Identifier), ScanType, ProbeDelay, ChannelList, MinChannelTime, MaxChannelTime, RequestInformation, and VendorSpecificInfo.

Here, the multi-RAT MS may stop the process of data transmission/reception through the ABS during the scan interval or beacon interval received from the ABS, for the purpose of alleviating interference. In this case, the multi-RAT MS may stop only the uplink transmission to the ABS or both the downlink and uplink transmissions to the ABS.

Here, the multi-RAT MS transmits the AP scanning-related control information to 802.11 MAC.

Afterwards, the multi-RAT MS performs scanning on the APs in the vicinity of the ABS based on the AP scanning-related control information received from the ABS (S320).

Next, the multi-RAT MS transmits the scan result to the ABS according to a scan result reporting condition included in the multi-RAT scan command message (S330).

The scan result may be transmitted to the base station periodically, one time, or according to a scan reporting trigger condition, depending on what is included in the multi-RAT scan command message.

Here, the scan result transmitted by the multi-RAT MS may be transmitted to the ABS through a multi-RAT scan response message (or scan confirmation message).

In this case, the multi-RAT scan response message may include the following information (or parameters).

: BSSDescriptionSet for indicating the result of a scan request.

: BSSDescriptionFromMeasurementPilotSet for indicating the result of a scan request obtained from a channel state measurement pilot.

: ResultCode for indicating the result of a MLMESCAN confirm primitive.

: VendorSpecifiInfo

Second Exemplary Embodiment

The second exemplary embodiment provides a method for a multi-RAT MS to scan second base stations by using a trigger condition (or scanning-related trigger condition) received from the first base station.

Hereinafter, for convenience of description, it is assumed that the primary base station is referred to as an 'ABS' and the second base station is referred to as an 'AP'.

That is, the second exemplary embodiment provides a method for a multi-RAT MS to scan APs by using a trigger condition (or scanning trigger condition) newly defined by the ABS.

Accordingly, the multi-RAT MS (having both 802.16 and 802.11 MAC/PHY) does not transmit and receive to and from the ABS a separate message for triggering scanning or scan result reporting, but scans APs and reports the result of scanning the APs, if a specific condition is satisfied, by using a trigger condition newly defined by the ABS.

Figure 4:
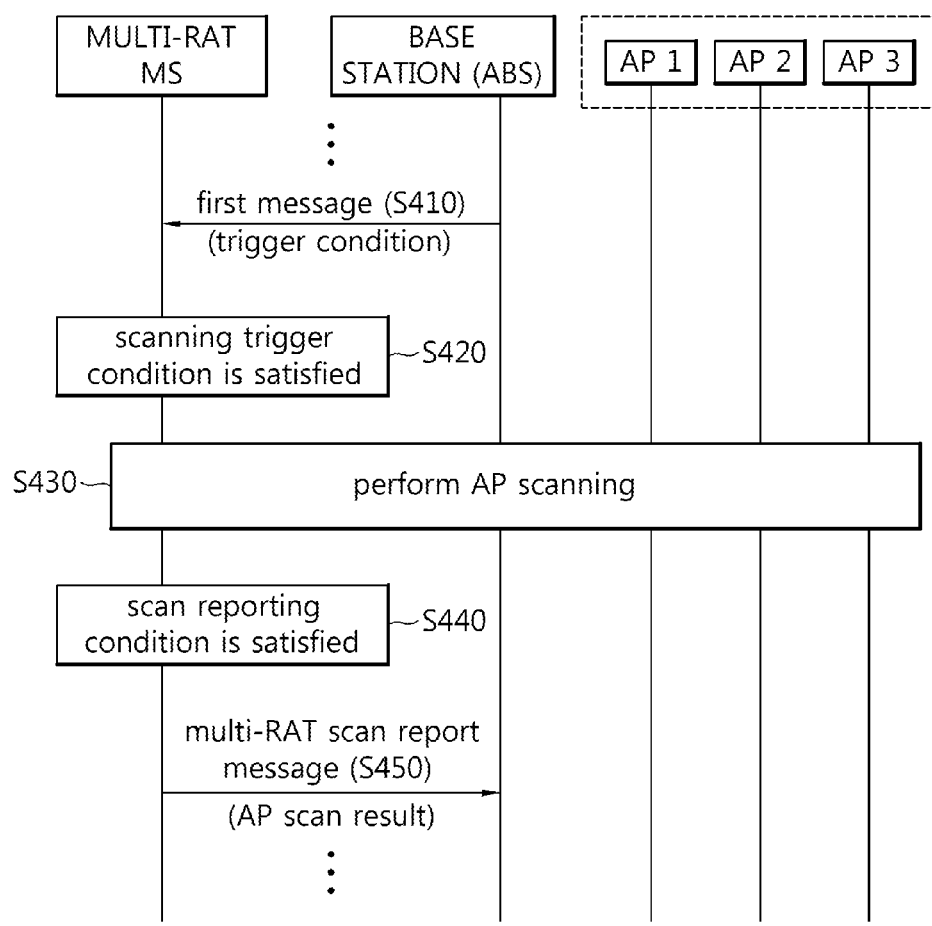
FIG. 4 is a flowchart showing a scanning procedure of a multi-RAT MS according to a second exemplary embodiment of the present invention.

FIG. 4 is a flowchart showing a scanning procedure of a multi-RAT MS according to a second exemplary embodiment of the present invention.

The steps S210, S220, and S240 of FIG. 2 also apply to the second exemplary embodiment to be described below. Accordingly, only the scanning procedure of the multi-RAT MS will be described in detail below.

Referring to FIG. 4, the multi-RAT MS receives a first message including a trigger condition from the ABS (S410). Here, the trigger condition may be a trigger condition defined for a scanning-related operation between the ABS and the multi-RAT MS, and preferably, may be a new trigger condition defined for a scanning-related operation between the APs and the multi-RAT MS. Here, the scanning-related operation may be scanning, scanning reporting, etc, and the scanning is preformed on the APs and the scanning reporting is performed on the ABS.

In addition, the first message may an AAI_System Configuration Descriptor (SCD) message, a neighbor advertisement (AAI_NBR-ADV) message, a superframe header (SFH), a multicarrier advertisement (AAI_MC-ADV) message, a broadcast message such as a PGID-info message transmitted to an idle mode MS or a PAG-ADV message, or a MultiRAT related broadcast message (e.g., MultiRAT_NBR-ADV).

In another example, the first message may include AP-specific triggering information (or a trigger definition) of various sizes.

Also, if a metric for starting scanning of the APs by the multi-RAT MS is an MS-specified value, the trigger condition may be transmitted to each MS in a unicast way.

The trigger condition includes a Trigger Action field (or parameter) and a Trigger Metric field.

The Trigger Action field is information that instructs to start scanning or report a scan result. Here, the value for instructing to start scanning can be omitted.

Also, the Trigger Metric field is information that represents a metric for: 1) starting scanning; or 2) reporting a scan result, which are defined in the Trigger Action field.

First, a specific condition for the start of scanning by the multi-RAT MS may involve generating traffic desired to be transmitted to the APs through a Dynamic Service Addition (DSA) process or selecting the APs by a preferred system through the DSA process.

That is, if traffic desired to be transmitted through the APs is defined in the multi-RAT capability negotiation process between the ABS and the multi-RAT MS, and the defined traffic is generated through the DSA process between the ABS and the multi-RAT MS, the multi-RAT MS may start scanning of the APs (S420).

Alternatively, if IEEE 802.11 (WLAN, AP) is selected as a preferred system (or preferred base station) for a service flow added in the DSA process between the ABS and the multi-RAT MS, the multi-RAT MS may start scanning of the APs in the vicinity of the ABS (S420).

Accordingly, the start of scanning of the APs by the multi-RAT MS may be determined by the service flow or traffic added (or generated) through the Dynamic Service Addition (DSA) process between the ABS and the multi-RAT MS.

That is, traffic or QoS characteristics set through a DSA message may be used as the metric for starting scanning.

Next, the metric for reporting a scan result may include the following definitions:

1) the metric of a neighbor AP is greater than an absolute value; 2) the metric of the neighbor AP is less than the absolute value; 3) the metric of the neighbor AP is relatively less than the metric of the ABS; and 4) the metric of the neighbor AP is relatively greater than the metric of the ABS.

In another example, the trigger condition may be AP-specifically defined. That is, the trigger condition related to scanning of the APs by the multi-RAT MS may be AP-specifically defined.

In this case, the above-described trigger condition may be defined for each of the APs in the vicinity of the ABS, or have a different value defined depending on service flow characteristics (or traffic characteristics).

Here, if the trigger condition is defined depending on service flow or traffic characteristics, the trigger condition may be transmitted in a unicast way.

The QoS parameters for a service flow are defined through the DSA process, and a different trigger condition may be required, even for the same QoS type, depending on the characteristics of actually transmitted traffic.

In an example, although, if a service flow characteristic is voice traffic, it is more preferred to communicate over a cellular network (primary system, first base station, and ABS), communication over a WLAN network may be preferred if the channel state of the WLAN network (secondary system, second base station, AP) is very good.

If a service flow characteristic is data traffic, communication over a WLAN network may be preferred to communication over a cellular network even if the signal strength of the APs is weak.

Accordingly, the required threshold value for scanning or scanning reporting may differ depending on service flow or data characteristics, it may be necessary to transmit trigger definitions depending on traffic characteristics.

Hereinafter, examples of message formats including an AP-specifically defined trigger condition will be discussed with reference to the following Tables 1 to 4.

The following Table 1 shows an example of a system configuration description (AAI_SCD) message format including an AP-specific (Secondary System (SS)-Specific) trigger definition.

TABLE 1

| Field | Size (bits) | Value/Description | Condition |
|---|---|---|---|
| SS-specific Trigger definitions | variable | Secondary System-specific triggers with encoding defined in Table 5-SS-specific Trigger description.description. | present for different traffic characteristics |

The following Table 2 shows an example of a multi-RAT neighbor advertisement (MultiRAT_NBR-ADV) message format including an AP-specific (Secondary System (SS)-Specific) trigger definition.

TABLE 2

| Field | Size (bits) | Value/Description | Condition |
|---|---|---|---|
| SS-specific Trigger definitions | variable | Secondary System-specific triggers with encoding defined in Table 5-SS-specific Trigger | Optional Present for different traffic characteristics when the corresponding secondary system is required to apply different trigger condition from definitions of AAI-SCD message. |

The following Table 3 shows an example of a Dynamic Service Addition Request/Response (DSA-REQ/RSP) message format including an AP-specific (Secondary System (SS)-Specific) trigger definition.

TABLE 3

| Field | Size (bits) | Value/Description | Condition |
|---|---|---|---|
| FID | 4 | Flow identifier | Present when an ABS initiates AAI-DSAREQ |
| Preferred system | 1 | Indicates a preferred system 0b0: WiMAX (communication via ABS) 0b1: WLAN (communication via AP) | Optional Present when the AMS supports Multi-RATs. |
| If (Preferred system = 1) SS-specific Trigger definitions | variable | Secondary System-specific triggers with encoding defined in Table 5-SS-specific Trigger description. | Optional Present when the preferred system is WLAN and the corresponding secondary system is required to apply different trigger condition from definitions of AAI-SCD message. |

The following Table 4 shows an example of a multi-RAT scan command (MultiRAT-SCN-CMD) message format including an AP-specific (Secondary System(SS)-Specific) trigger definition.

TABLE 4

| Field | Size (bits) | Value/Description | Condition |
|---|---|---|---|
| Report mode | | 0b00: No report 0b01: Periodic report 0b10: Event-triggered report 0b11: One-time scan report | |
| Num of flows | | Number of active flows | Optional Present when the AMS supports Multi-RATs. |
| for(i=0;i++;i<Num of flows) FID SS-specific trigger definitions | | Flow identifier Secondary System-specific triggers with encoding defined in Table 5-SS-specific Trigger description. | Optional Present when the Report mode is 0b10 and the corresponding secondary system is required to apply different trigger condition from definitions of AAI-SCD message. |
| } | | | |

Referring to Table 4, since the MultiRAT-SCN-CMD message is an MS-specific value and the trigger definition is a flow-specific value, the trigger definition is defined for each flow in the MultiRAT-SCN-CMD message.

In addition, referring to Table 3, assuming that a parameter for indicating a preferred system of a flow generated through the DSA process is defined within the DSA-REQ or DSA- RSP message, if the parameter value is WLAN, trigger definitions for WLAN may be included in the DSA-REQ or DSA-RSP message.

Moreover, the ABS may define an AP-related trigger condition for defining a case where the multi-RAT MS reports the result of scanning the APs to the ABS.

Here, the definition of the trigger condition for reporting the result of scanning the APs by the Multi-RAT MS may be as shown in the following Table 5.

TABLE 5

| Name | Length (bits) | Value |
|---|---|---|
| Number of conditions | 2 | The number of conditions that are included in this trigger (see loop definition below). When more than one condition is included, this trigger is referred to as a complex trigger and is the logical AND combination of all the included conditions. |
| for(i=0; i<= Number of conditions; i++) { | | |
| Type/Function/Action | 3 | See Table 6-for description |
| Trigger Value | 8 | Trigger value is the value used in comparing measured metric for determining a trigger condition. |
| Trigger averaging parameter | 4 | The averaging parameter used for averaging this trigger metric according to equation (4). If not present, the default trigger averaging parameter in AAI-SCD is used.<br>0x0: 1<br>0x1: ½<br>0x2: ¼<br>0x3: ⅛<br>0x4: 1/16<br>0x5: 1/32<br>0x6: 1/64<br>0x7: 1/128<br>0x8: 1/256<br>0x9: 1/512<br>0xA to 0xF: reserved |
| } | | |

The Type/Function/Action fields for the AP-specific trigger condition in Table 5 may be as shown in the following Table 6.

TABLE 6

| Name | Size (bits) | Value | Description |
|---|---|---|---|
| Type | 1 (MSB) | Trigger metric type:<br>0x0: CINR metric<br>0x1: RSSI metric | |
| Function | 1 | Computation defining scanning and reporting trigger condition:<br>0x0: Metric of neighbor AP is greater than absolute value<br>0x1: Metric of/neighbor AP is less than absolute value<br>0x2: Metric of neighbor AP is less than S-ABS metric by relative value<br>0x3: Metric of neighbor AP is greater than S-ABS metric by relative value | |
| Action | 1 (LSB) | Action performed upon reaching trigger condition:<br>0b0: Respond on trigger with AAI_SCN-REP for neighbor AP<br>0b1: reserved | Action<br>0b0 applies to Function 0x0 and 0x1. |

Here, as shown in Table 6, assuming that a trigger condition for reporting the result of scanning the APs by the multi-RAT MS is defined, if the ABS determines that the multi-RAT MS needs to access the APs (second base station, secondary system), the ABS transmits a multi-RAT scan command message to the multi-RAT MS to trigger scanning of the APs within the ABS's coverage.

In addition, the ABS may transmit trigger parameters for reporting scanning of each AP through an AAI-NBR-ADV, AAI-MC-ADV, AAI_SCD, or MultiRAT-ADV message.

In this case, the multi-RAT MS performs scanning on the APs (S430), and then, if the trigger parameters for scan reporting transmitted through the above messages are satisfied (S440), the multi-RAT MS may perform scan reporting to the ABS (S450).

Moreover, the multi-RAT MS may receive a scan result, i.e., indication information that indicates whether to perform scan reporting, through a multi-RAT capability negotiation process with the ABS depending on the trigger condition defined as above.

Here, the indication information may be received from the ABS through a multiRAT-REQ/RSP message in the multi-RAT capability negotiation process. That is, the instruction information may be included as a 'scan reporting indication by trigger condition' field within the multiRAT-REQ/RSP message, and its size may be represented as 1 bit.

Here, if an AP is detected no matter how weak its signal strength is, while the multi-RAT MS is performing scanning on the APs (in response to a scanning command from the ABS or for other reasons), the indication information is transmitted to the multi-RAT MS because data transmission/reception through the detected AP may be desired.

Third Exemplary Embodiment

The third exemplary embodiment provides a method for performing a scanning a procedure on second base stations: 1) as the multi-RAT Ms requests the first base station to scan the second base stations; and 2) as the multi-RAT MS initiates scanning without a scanning instruction from the first base station.

Hereinafter, for convenience of description, it is assumed that the primary base station is referred to as an 'ABS' and the second base station is referred to as an 'AP'.

Figure 5:
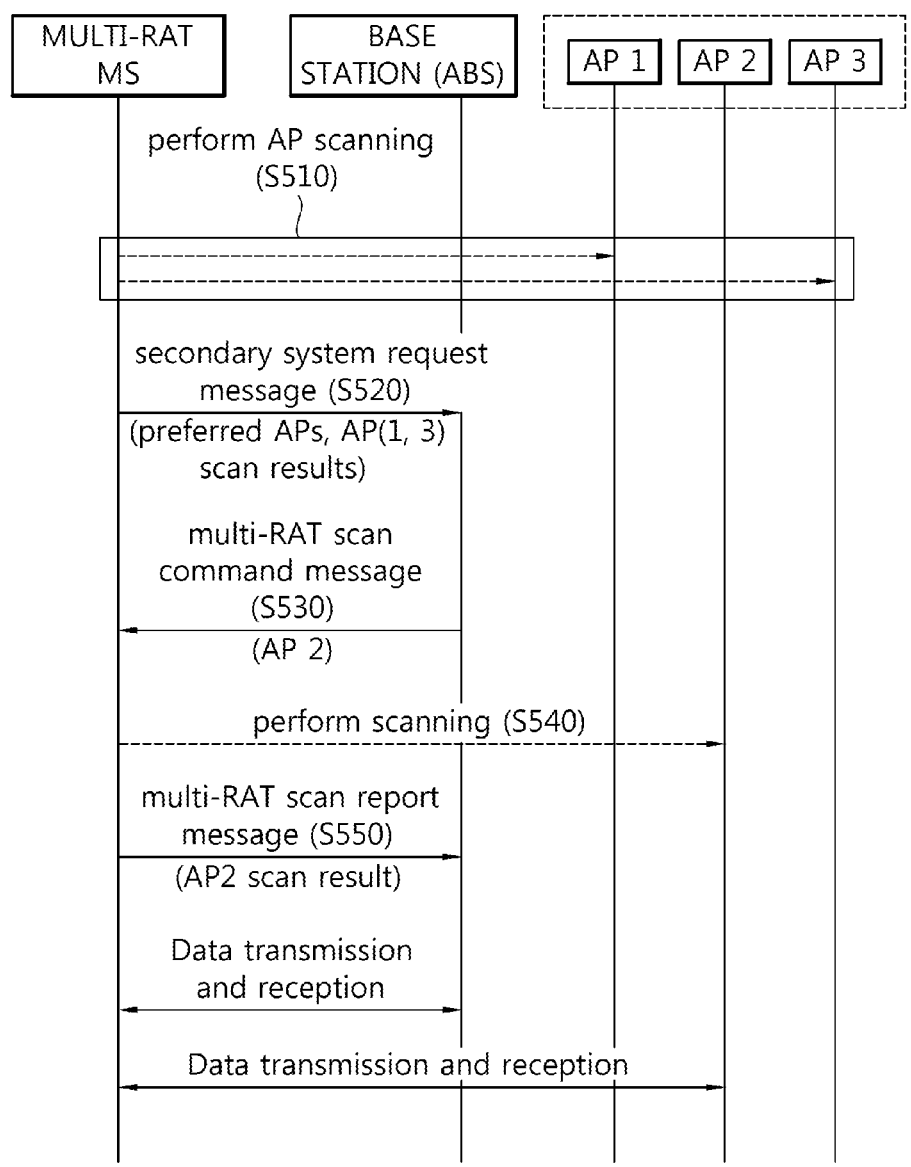
FIG. 5 is a flowchart showing a scanning procedure of a multi-RAT MS according to a third exemplary embodiment of the present invention.

FIG. 5 is a flowchart showing a scanning procedure of a multi-RAT MS according to a third exemplary embodiment of the present invention.

The steps S210, S220, and S240 of FIG. 2 also apply to the third exemplary embodiment to be described below. Accordingly, only the scanning procedure of the multi-RAT MS will be described in detail below.

Specifically, FIG. 5 shows a method in which scanning is performed as the multi-RA MS initiates the scanning without a scan command instruction from the ABS, and scanning-related information is additionally received from the ABS to make the scanning efficient.

Referring to FIG. 5, the multi-RAT MS performs scanning on the APs located in the vicinity of the ABS (S510). Here, scanning by the multi-RAT MS may be initiated when a service flow is generated through the DSA process mentioned in the second exemplary embodiment. Here, for the service flow generated through the DSA process, communication with the APs may be defined in advance or indicated thorough the DSA process.

Afterwards, the multi-RAT MS transmits a first message (e.g., SS-REQ message) for requesting the ABS to join the APs (S520). Here, the first message includes the result of scanning the APS performed in S510 and information regarding the AP(s) preferred for access.

Here, the ABS may determine whether to instruct the multi-RAT MS to perform scanning (or re-scanning) on the APs based on the information included in the first message received from the multi-RAT MS.

Here, if the ABS determines to instruct the multi-RAT MS to perform re-scanning on an AP, the ABS transmits a multi-RAT scan command message to the multi-RAT MS (S530). Here, the multi-RAT scan command message includes information regarding the AP to be scanned. As shown in FIG. 5, the AP to be re-scanned by the multi-RAT MS is the AP2.

Afterwards, the multi-RAT MS performs scanning on the AP2 (S540), and transmits the scan result to the ABS through a multi-RAT scan report message (S550).

Next, the multi-RAT MS performs an association procedure with the AP2, and can transmit and receive data through the AP2 and the ABS.

Figure 6:
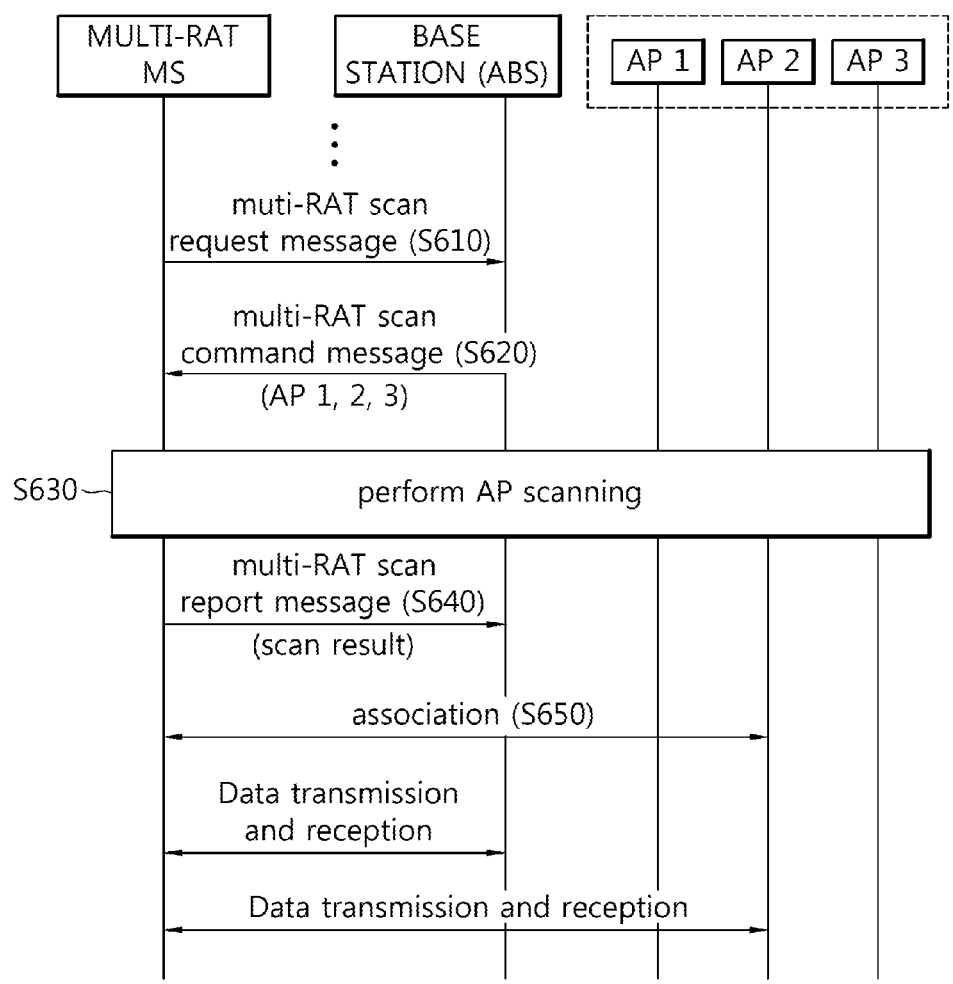
FIG. 6 is another flowchart showing a scanning procedure of a multi-RAT MS according to the third exemplary embodiment of the present invention.

FIG. 6 is another flowchart showing a scanning procedure of a multi-RAT MS according to the third exemplary embodiment of the present invention.

The steps S210, S220, and S240 of FIG. 2 also apply to the third exemplary embodiment to be described below. Accordingly, only the scanning procedure of the multi-RAT MS will be described in detail below.

That is, FIG. 6 shows a method for performing scanning the APs by sending a scan request from the multi-RAT MS to the ABS.

Referring to FIG. 6, the multi-RAT MS transmits a multi-RAT scan request message for requesting the ABS to scan the APs (S610).

Afterwards, the ABS transmits a multi-RAT scan command message that instructs the multi-RAT MS to perform scanning on the APs (APs 1, 2, and 3) (S620).

Next, the multi-RAT MS performs scanning on the APs (APs 1, 2, and 3) (S630), and transmits the scan result to the ABS through a multi-RAT scan report message (S640).

Next, the ABS selects an AP to be associated with the multi-RAT MS, and transmits information regarding the selected AP (AP2) to the multi-RAT MS.

As such, the multi-RAT MS can perform an association procedure with the selected AP (AP2) (S650), and transmit and receive data.

One Exemplary Embodiment of the Present Invention

Figure 7:
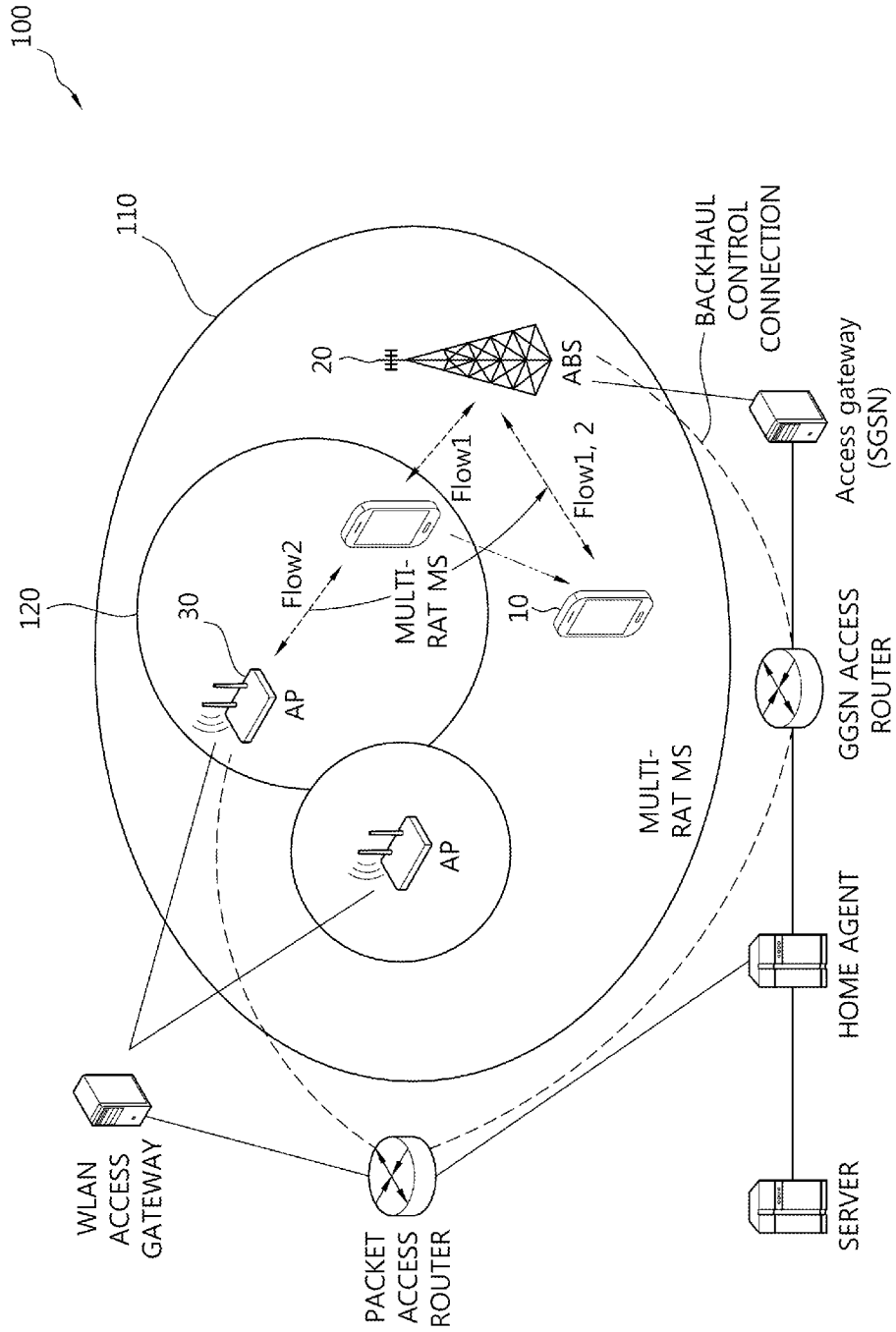
FIG. 7 is a conceptual view showing a multi-RAT network to which another exemplary embodiment of the present invention is applicable.

FIG. 7 is a conceptual view showing a multi-RAT network according to another exemplary embodiment of the present invention.

As described above, when a multi-RAT MS 10 with a link to the primary system 110 enters the coverage of the secondary system 120, it is necessary to inform the ABS 20 of channel state information regarding an unassociated AP 30 in order to prepare for communication with the secondary system 120, and a trigger condition for a neighbor AP may be defined to inform the ABS 20 about the signal strength of the AP 30 without an instruction from the ABS 20.

However, as shown in FIG. 7, because the multi-RAT MS 10 with links to the primary system 110 and the secondary system 120 has mobility while transmitting and receiving data about flows (Flow 1 and Flow 2) to and from each link, the multi-RAT MS 10 can therefore move out of the coverage of the secondary system 120. If the multi-RAT MS 10 moves out of the coverage of the secondary system 120, data for the flow (Flow 2) being transmitted via the link to the secondary system 120 has to seamlessly move to the primary system 110.

Under this situation, the ABS 20 may not be aware of the mobility (moving out of the coverage of the secondary system 120) of the MS, and this may mean that seamless flow mobility cannot be provided to data being transmitted via the link to the secondary system 120. To such seamless flow mobility, the multi-RAT MS 10 needs to provide the ABS 20 with channel state information regarding a serving AP, and it is necessary to define a trigger condition for this.

Accordingly, one exemplary embodiment of the present invention provides a method for transmitting channel quality information to the second base station from the multi-RAT MS by using a trigger condition received from the first base station.

Hereinafter, for convenience of description, it is assumed that the primary base station is referred to as an 'ABS' and the second base station is referred to as an 'AP'.

That is, one exemplary embodiment of the present invention provides a method for transmitting the channel quality of the serving AP from the multi-RAT MS to the ABS by using a newly defined trigger condition (or scanning triggering information).

Accordingly, the multi-RAT MS (having both 802.16 and 802.11 MAC/PHY) does not transmit and receive to and from the ABS a separate message for triggering channel quality information transmission, but reports the channel quality information regarding the serving AP to the ABS, if a specific condition is satisfied, by using a trigger condition newly defined by the ABS.

Figure 8:
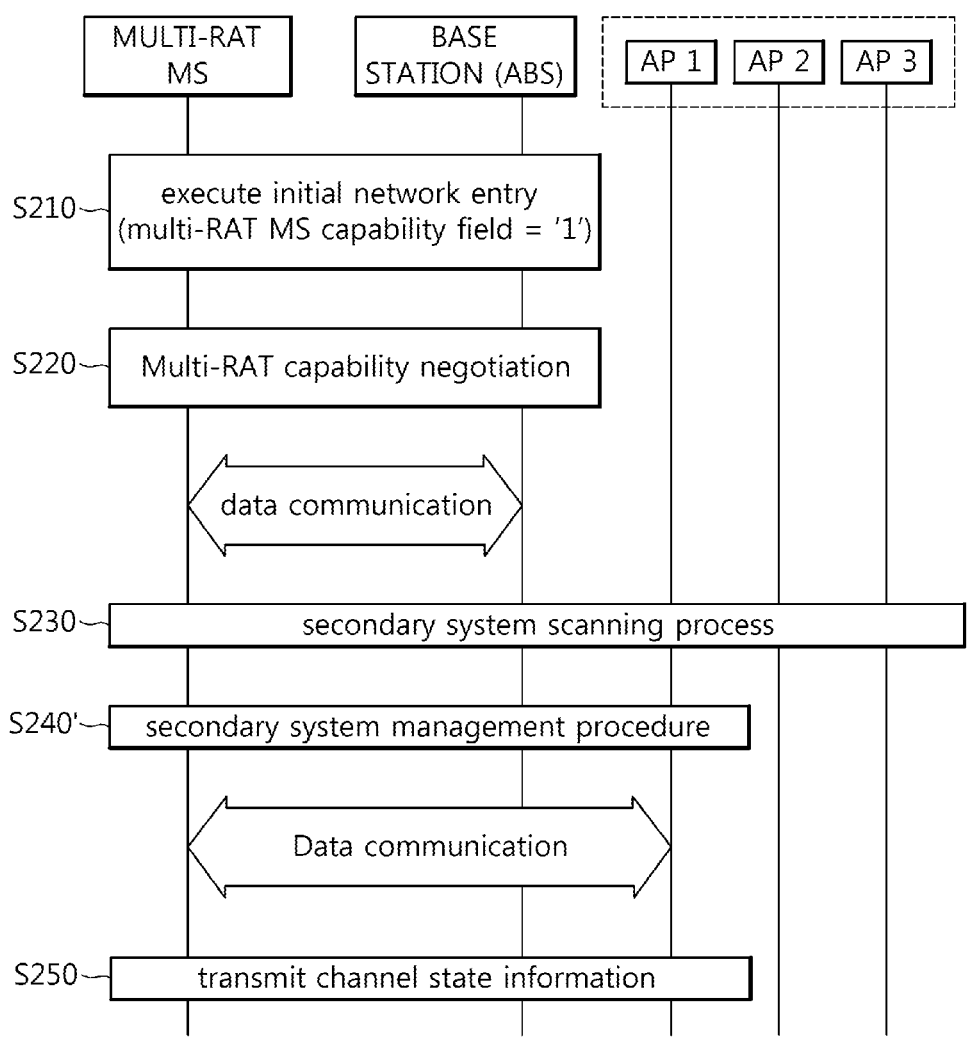
FIG. 8 is a flowchart showing another method for a multi-RAT MS to transmit and receive data through a primary system and a secondary system.

FIG. 8 is a flowchart showing another method for a multi-RAT MS to transmit and receive data through a primary system and a secondary system.

The steps S210, S220, and S240 of FIG. 2 also apply to one exemplary embodiment to be described below. Accordingly, only the operation procedure of the secondary system and the channel quality information transmission of the multi-RAT MS according to one exemplary embodiment of the present invention will be described in detail below.

The multi-RAT MS performs a management (or operation) procedure with the secondary system (S240'). Here, the management procedure with the secondary system refers to association with the secondary system of the multi-RAT MS. Afterwards, the multi-RAT MS is able to transmit and receive to and from the secondary system, as well as to and from the primary system.

For example, the multi-RAT MS transmits and receives data for a specific flow (e.g., Flow2 of FIG. 7) through the secondary system. That is, the multi-RAT MS transmits and receives data to and from the primary system (through flow1) and the secondary system (through flow2) simultaneously depending on data flows.

In this state, the multi-RAT MS performs a channel state information transmission process on the serving AP (S250). Here, the multi-RAT MS performs a channel state information transmission process on the serving AP in an event-triggered manner.

The channel state information process on the serving AP by the multi-RAT MS will be described in detail below with reference to FIG. 9. Here, the channel state information includes channel quality information.

Figure 9:
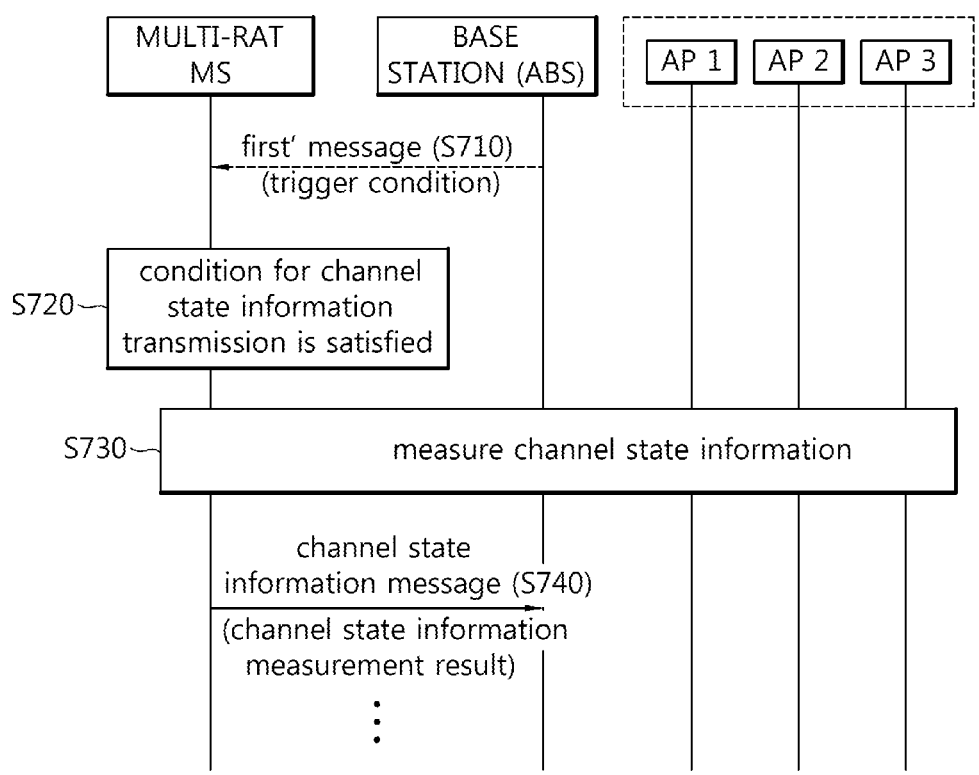
FIG. 9 is a flowchart showing a channel quality information transmission procedure of a multi-RAT MS according to another exemplary embodiment of the present invention.

FIG. 9 is a flowchart showing a channel quality information transmission procedure of a multi-RAT MS according to another exemplary embodiment of the present invention.

The steps S210, S220, and S240 of FIG. 2 also apply to the second exemplary embodiment to be described below. Accordingly, only the channel quality information transmission procedure of the multi-RAT MS will be described in detail below.

Referring to FIG. 9, the multi-RAT MS receives a first' message including a trigger condition from the ABS (S710).

In addition, the first' message may an AAI_System Configuration Descriptor (SCD) message, a neighbor advertisement (AAI_NBR-ADV) message, a superframe header (SFH), a multicarrier advertisement (AAI_MC-ADV) message, a broadcast message such as a PGID-info message transmitted to an idle mode MS or a PAG-ADV message, or a MultiRAT related broadcast message (e.g., MultiRAT_NBR-ADV).

In another example, the first' message may include AP-specific triggering information (or a trigger definition) of various sizes.

The trigger condition includes a Trigger Action field (or parameter) and a Trigger Metric field.

The Trigger Action field is information that instructs to transmit channel quality information.

Also, the Trigger Metric field is information that represents a metric for channel quality information transmission, which is defined in the Trigger Action field.

Next, the metric for channel quality information transmission may include the following definitions:

1) the metric of a serving AP is greater than an absolute value; 2) the metric of the serving AP is less than the absolute value; 3) the metric of the serving AP is relatively less than the metric of the ABS; and 4) the metric of the serving AP is relatively greater than the metric of the ABS.

In another example, the trigger condition may be AP-specifically defined. That is, the trigger condition related to the transmission of the channel quality of the APs by the multi-RAT MS may be AP-specifically defined.

In this case, the trigger condition as set forth above may be defined along with triggering information (e.g., SS-specific triggering information) defined to transmit a scanning result of the above-mentioned neighbor AP, or may be defined as another triggering information (e.g., SAP-specific triggering information).

Hereinafter, examples of message formats including an AP-specifically defined trigger condition will be discussed with reference to the following Tables 7 to 8.

The following Table 7 shows an example of a system configuration description (AAI_SCD) message format including an AP-specific (Secondary System (SS)-Specific) trigger definition.

TABLE 7

| Field | Size (bits) | Value/Description | Condition |
|---|---|---|---|
| SS (or SAP)-specific Trigger definitions | variable | Refer to Table xxx-AP-specific Trigger description | present for a secondary system (or AP) |

The following Table 8 shows an example of a multi-RAT neighbor advertisement (MultiRAT_NBR-ADV) message format including an AP-specific (Secondary System(SS)-Specific) trigger definition.

TABLE 8

| Field | Size (bits) | Value/Description | Condition |
|---|---|---|---|
| SS (or SAP)-specific Trigger definitions | variable | Secondary System-specific triggers with encoding defined in Table xxx.-AP-specific Trigger description | Optional Present when the corresponding secondary system (or AP) is required to apply different trigger condition from definitions of AAI-SCD message. |

The Type/Function/Action fields for the AP-specific trigger condition in Table 5 may be as shown in the following Table 9. Table 9 substitutes for the Type/Function/Action fields for the AP-specific trigger condition shown in Table 6.

TABLE 9

| Name | Size (bits) | Value | Description |
|---|---|---|---|
| Type | 1 (MSB) | | Trigger metric type: 0x0: CINR metric 0x1: RSSI metric |
| Function | 1 | | Computation defining scanning and reporting trigger condition: 0x0: Metric of neighbor AP is greater than absolute value 0x1: Metric of neighbor AP is less than absolute value 0x2: Metric of neighbor AP is less than S-ABS metric by relative value 0x3: Metric of neighbor AP is greater than S-ABS metric by relative value |

TABLE 9-continued

| Name | Size (bits) | Value | Description |
|---|---|---|---|
| | | 0x4: Metric of serving AP is less than absolute value | |
| | | 0x5: Metric of serving AP is greater than absolute value | |
| | | 0x6: Metric of serving AP is less than S-ABS(or neighbor AP) metric by relative value | |
| | | 0x7: Metric of serving AP is greater than S-ABS(or neighbor AP) metric by relative value | |
| Action | 1 (LSB) | Action performed upon reaching trigger condition:<br>0b0: Respond on trigger with AAI_SCN-REP for neighbor AP<br>0b1: Respond on trigger with AAI_SCN-REP for serving AP | Action 0b0 applies to Function 0x0-0x3.<br>Action 0b1 applies to Function 0x4-0x7. |

As described above, if the ABS determines that the multi-RAT MS needs to access the APs (second base station, secondary system), the ABS transmits a multi-RAT scan command message to the multi-RAT MS to trigger scanning of the APs within the ABS's coverage.

In addition, the ABS may transmit trigger parameters for reporting scanning of each AP through an AAI-NBR-ADV, AAI-MC-ADV, AAI_SCD, or MultiRAT-ADV message. According to one exemplary embodiment of the present invention, the ABS may transmit trigger parameters for transmitting channel quality information regarding the serving AP, along with trigger parameters for scan reporting, through an AAI-NBR-ADV, AAI-MC-ADV, AAI_SCD, or MultiRAT-ADV message.

If the trigger parameters for channel quality information transmission transmitted through the above messages are satisfied (S720), the multi-RAT MS may measure the channel quality information regarding the serving AP (S730) and transmit the channel quality information to the ABS (S740).

In another example, the multi-RAT MS measures the channel quality information regarding the serving AP, and if the trigger parameters for channel quality information transmission transmitted through the above messages are satisfied, may transmit the channel quality information to the ABS.

Upon receiving the channel quality information regarding the serving AP from the multi-RAT, if the channel quality of the serving AP does not meet predetermined criteria, the ABS may perform an action of moving Flow2 from the AP to the ABS so that data corresponding to Flow2 being transmitted and received through the AP is seamlessly transmitted and received through the ABS.

The above-described embodiments and modified embodiments may be combined with each other, and thus, may be used alone or in combination thereof, if necessary. The combination may be easily implemented by one of ordinary skill in the art, and thus, a detailed description thereof will not be given here. Although not described, it is to be appreciated that the combination is not precluded, and is within the scope of the invention.

The embodiments of the present invention may be achieved by various means, for example, hardware, firmware, software, or a combination thereof.

In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

For example, the methods according to the present invention may be stored in a storage medium (e.g., an internal memory, a flash memory, a hard disk, etc.) and may be implemented as code or commands in a software program that can be executed by a processor (e.g., a microprocessor), which will be described with reference to FIG. 7.

Figure 10:
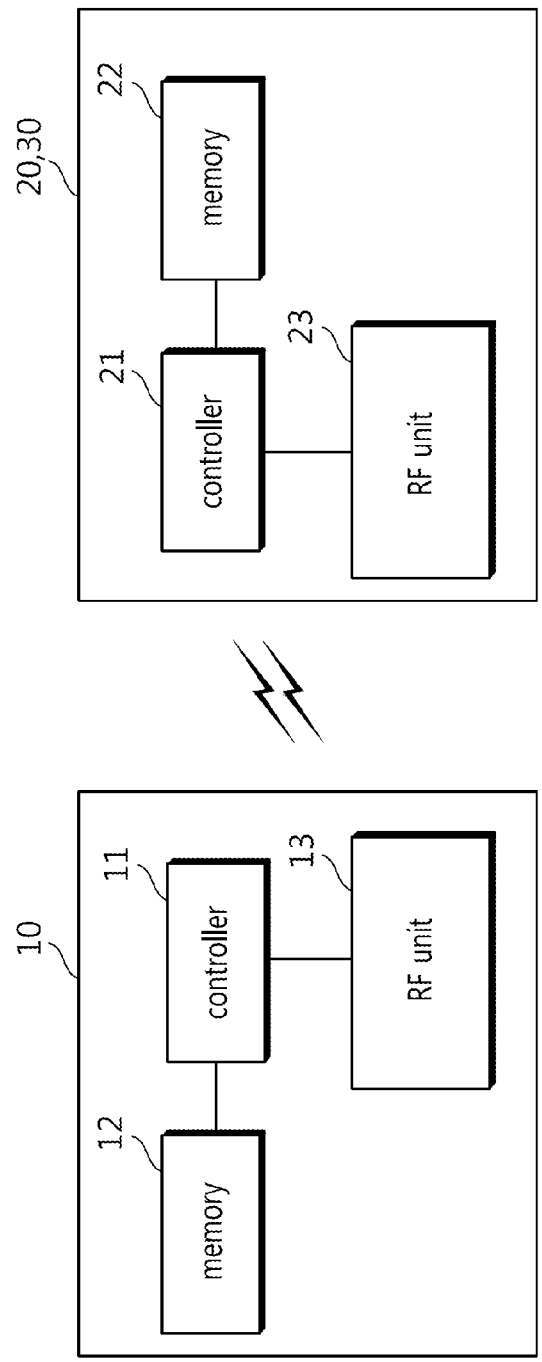
FIG. 10 is an internal block diagram of an MS and base stations in a radio access system to which an embodiment of the present invention can be applied.

FIG. 10 is an internal block diagram of an MS and base stations in a radio access system to which an embodiment of the present invention can be applied.

The MS 10 includes a controller 11, a memory 12, and a radio frequency (RF) unit 13.

The MS 10 may be fixed or mobile and may be referred to as other terms such as user equipment (UE), user terminal (UT), subscriber station (SS), wireless device, and advance mobile station (AMS). In addition, the MS 10 includes the multi-RAT MS.

The MS 10 includes a display unit, a user interface unit, or the like.

The controller 11 implements proposed functions, procedures, and/or methods. Layers of a wireless interface protocol may be implemented by the controller 11.

The memory 12 is connected to the controller 11 and stores protocols or parameters for wireless communication. That is, the memory 12 stores an MS driving system, applications, and general files.

The RF unit 13 is connected to the controller 11 and transmits and/or receives an RF signal.

In addition, the display unit may display various information of the MS 10 and may use a well known element such as a liquid crystal display (LCD), an organic light emitting diode (OLED), or the like. The user interface unit may include a combination of well known user interfaces such as keypads, touchscreens, or the like.

The base stations 20 and 30 include a controller 21, a memory 22, and an RF unit 23.

Here, in general, the base stations 20 and 30 may each be fixed stations that communicate with the MS 10 and may be referred to as other terms such as NodeB, base transceiver system (BTS), access point, or the like. One or more cells may exist in one base station.

The controller 21 implements proposed functions, procedures, and/or methods. Layers of a wireless interface protocol may be implemented by the controller 21.

The memory 22 is connected to the controller 21 and stores protocols or parameters for wireless communication.

The RF unit 23 is connected to the controller 21 and transmits and/or receives an RF signal.

The controllers 11 and 21 may each include an application-specific integrated circuit (ASIC), other chipsets, a logical circuit, and/or a data processor. The memories 12 and 22 may include a read-only memory (ROM), a random access memory (RAM), a flash memory, a memory card, a storage medium, and/or other storage devices. The RF units 13 and 23 may each include a baseband circuit for processing an RF signal. When the embodiments of the present invention are implemented in the form of software, the above-described methods may be implemented in the form of a module (a procedure, a function, etc.) for performing the above-described functions. The module may be stored in the memories 12 and 22 and may be executed by the controllers 11 and 21.

The memories 12 and 22 may be located inside or outside the controllers 12 and 22 and may be connected to the controllers 11 and 21 via various well known means.

The terminology used herein is for the purpose of describing particular embodiments only and is not intended to be limiting of the present invention. Unless otherwise defined, all technical terms used herein have the same meaning as commonly understood by one of ordinary skill in the art to which this present invention pertains and will not be interpreted in overly wide or narrow sense unless expressly so defined herein. If a term used herein is a wrong term by which one of ordinary skill in the art cannot correctly understand the present invention, the wrong term should be replaced by a technical term by which one of ordinary skill in the art can correctly understand the present invention. It will be further understood that terms, such as those defined in commonly used dictionaries, should be interpreted as having a meaning that is consistent with their meaning in the context of the relevant art and will not be interpreted in an overly narrow sense.

As used herein, the singular forms "a," "an" and "the" are intended to include the plural forms as well, unless the context clearly indicates otherwise. It will be further understood that the terms "comprises" or "comprising" are not intended to included all elements or all steps described herein, but do not preclude exclusion of some elements or steps described herein or addition of one or more other elements or steps.

It will be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements present.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

What is claimed is:

1. A method for a mobile station (MS) to support mobility between a first flow and a second flow in a radio access system supporting a multi-Radio Access Technology (RAT), the method comprising:

establishing the first flow for a first base station supporting a first RAT and the second flow for a second base station supporting a second RAT;

receiving, from the first base station, triggering information after establishing the second flow for the second base station, wherein the triggering information includes trigger metric types, trigger metric functions, and a trigger action field, wherein the trigger metric types include:
a Carrier to Interface Ratio (CINR) metric, and
a Received Signal Strength Indication (RSSI) metric, wherein the trigger metric functions include:
a first definition, which is a metric of the second base station and is greater than an absolute value determined by the first base station,
a second definition, which is the metric of the second base station and is less than the absolute value,
a third definition, which is the metric of the second base station and is relatively less than a metric of the first base station, and
a fourth definition, which is the metric of the second base station and is relatively greater than the metric of the first base station, wherein the trigger action field indicates to transmit the channel state information (CSI) regarding the second base station to the first base station, according to the trigger metric types and the trigger metric functions;

transmitting, to the first base station, the CSI regarding the second base station, based on the triggering information; and transferring the second flow from the second base station to the first base station, after transmitting, to the first base station, the CSI regarding the second base station.

2. The method of claim 1, wherein the second base station is included in coverage of the first base station.

3. The method of claim 1, wherein the triggering information, from the first base station, is received along with triggering information related to scanning of the second base station.

4. The method of claim 1, wherein the triggering information, from the first base station, is received by a broadcast way.

5. The method of claim 1, wherein the CSI regarding the second base station includes channel quality information (CQI).

6. A mobile station (MS) transmitting first data and second data in a radio access system supporting a multi-Radio Access Technology (RAT), the MS comprising:

a radio frequency unit for transmitting a radio signal; and a controller coupled to the radio frequency unit, and configured to:

establish the first flow for a first base station supporting a first RAT and the second flow for a second base station supporting a second RAT,
receive, from the first base station, triggering information after establishing the second flow for the second base station,
wherein the triggering information includes trigger metric types, trigger metric functions, and a trigger action field,
wherein the trigger metric types include:
- a Carrier to Interface Ratio (CINR) metric, and
- a Received Signal Strength Indication (RSSI) metric, wherein the trigger metric functions include:
- a first definition, which is a metric of the second base station and is greater than an absolute value determined by the first base station,
- a second definition, which is the metric of the second base station and is less than the absolute value,
- a third definition, which is the metric of the second base station and is relatively less than a metric of the first base station, and
- a fourth definition, which is the metric of the second base station and is relatively greater than the metric of the first base station, wherein the trigger action field indicates to transmit the channel state information (CSI) regarding the second base station to the first base station, according to the trigger metric types and the trigger metric functions,
transmit, to the first base station, the CSI regarding the second base station based on the triggering information, and
transfer the second flow from the second base station to the first base station, after transmitting, to the first base station, the CSI regarding the second base station.

* * * * *